(12) United States Patent
Rattasiri et al.

(10) Patent No.: US 8,756,922 B2
(45) Date of Patent: Jun. 24, 2014

(54) $NO_x$ ADSORBER CATALYST CONDITION EVALUATION APPARATUS AND ASSOCIATED METHODS

(75) Inventors: Waratt Rattasiri, Columbus, IN (US); Neal W. Currier, Columbus, IN (US); Mathew L. Allen, Franklin, IN (US)

(73) Assignee: Cummins IP, Inc., Minneapolis, MN (US)

( * ) Notice: Subject to any disclaimer, the term of this patent is extended or adjusted under 35 U.S.C. 154(b) by 522 days.

(21) Appl. No.: 13/158,240

(22) Filed: Jun. 10, 2011

(65) Prior Publication Data

US 2012/0311995 A1 Dec. 13, 2012

(51) Int. Cl.
*F01N 3/00* (2006.01)

(52) U.S. Cl.
USPC .................. 60/295; 60/285; 60/301

(58) Field of Classification Search
CPC ............ Y02T 10/20; F01N 3/10; F01N 3/08; F01N 3/0253; F01N 3/0842; F01N 3/00; F01N 3/2073; F01N 3/20; F01N 3/0814; F01N 3/0807; F01N 3/0293; F01N 2560/025; F01N 2900/0601; F01N 2550/02; F02D 41/0275; F02D 41/1454; F02D 41/1456; F02D 2200/0806
USPC ............. 60/274, 285, 286, 295, 301
See application file for complete search history.

(56) References Cited

U.S. PATENT DOCUMENTS

| | | | |
|---|---|---|---|
| 5,237,818 A | 8/1993 | Ishii et al. | |
| 5,267,439 A | 12/1993 | Raff et al. | |
| 5,303,580 A | 4/1994 | Schneider et al. | |
| 5,317,868 A | 6/1994 | Blischke et al. | |
| 5,335,538 A | 8/1994 | Blischke et al. | |
| 5,359,853 A | 11/1994 | Shimizu | |
| 5,488,858 A | 2/1996 | Achleitner | |
| 5,627,757 A | 5/1997 | Comignaghi et al. | |
| 5,761,901 A | 6/1998 | Staufenberg et al. | |
| 5,851,376 A | 12/1998 | Nishioka et al. | |
| 5,875,628 A | 3/1999 | Mitsutani | |
| 6,003,307 A | 12/1999 | Naber et al. | |
| 6,116,021 A | 9/2000 | Schumacher et al. | |
| 6,216,449 B1 * | 4/2001 | Strehlau et al. | 60/274 |
| 6,301,881 B1 | 10/2001 | Kumar | |

(Continued)

FOREIGN PATENT DOCUMENTS

DE 4331153 A1 3/1994
DE 10023060 B4 * 12/2009

(Continued)

*Primary Examiner* — Thomas Denion
*Assistant Examiner* — Patrick Maines
(74) *Attorney, Agent, or Firm* — Foley & Lardner LLP

(57) ABSTRACT

According to one embodiment, an apparatus for evaluating the condition of a NOx adsorber catalyst (NAC) of an internal combustion engine system includes a rich condition timing module, NAC outlet lambda module, and NAC condition module. The rich condition timing module is configured to accumulate the total time during which exhaust gas exiting the NAC has a lambda value less than 1.0. The NAC outlet lambda module is configured to store NAC outlet lambda values of the exhaust gas while the exhaust gas exiting the NAC has a lambda value less than 1.0. The NAC condition module is configured to evaluate the condition of the NAC based on the total time during which exhaust gas exiting the NAC has a lambda value less than 1.0 and an accumulation of the stored NAC outlet lambda values.

17 Claims, 8 Drawing Sheets

(56) References Cited

U.S. PATENT DOCUMENTS

| | | |
|---|---|---|
| 6,497,092 B1 | 12/2002 | Theis |
| 6,499,291 B2 * | 12/2002 | Lang et al. ............... 60/277 |
| 6,581,371 B1 | 6/2003 | Orzel et al. |
| 6,601,381 B2 | 8/2003 | Mussmann et al. |
| 6,631,611 B2 | 10/2003 | Shi et al. |
| 6,673,619 B2 | 1/2004 | Sawada |
| 6,684,628 B2 | 2/2004 | Gobel et al. |
| 6,694,243 B2 | 2/2004 | Shi et al. |
| 6,803,236 B2 | 10/2004 | Bailey et al. |
| 6,901,742 B1 | 6/2005 | Lang et al. |
| 6,922,985 B2 | 8/2005 | Wang et al. |
| 6,990,854 B2 | 1/2006 | van Nieuwstadt et al. |
| 7,003,943 B2 | 2/2006 | Ketterer et al. |
| 7,281,369 B2 | 10/2007 | Emi et al. |
| 7,343,734 B2 | 3/2008 | Aliakbarzadeh et al. |
| 7,484,407 B2 | 2/2009 | Arlt et al. |
| 7,536,851 B2 | 5/2009 | Mc Lain |
| 7,628,063 B2 | 12/2009 | Yezerets et al. |
| 8,065,871 B1 * | 11/2011 | Fraser ..................... 60/295 |
| 2002/0012623 A1 * | 1/2002 | Gobel et al. ............ 423/239.1 |
| 2004/0040282 A1 | 3/2004 | Zhu |
| 2004/0163381 A1 * | 8/2004 | Shirakawa et al. ............ 60/285 |
| 2004/0250531 A1 * | 12/2004 | Palma et al. ................. 60/277 |
| 2005/0119822 A1 | 6/2005 | Surnilla et al. |
| 2005/0223699 A1 | 10/2005 | Ancimer et al. |
| 2007/0234708 A1 | 10/2007 | Jones et al. |
| 2007/0256405 A1 * | 11/2007 | Gabe et al. ................... 60/274 |
| 2008/0110234 A1 | 5/2008 | Odendall |
| 2008/0148804 A1 * | 6/2008 | Yezerets et al. ............... 73/1.01 |
| 2008/0314023 A1 | 12/2008 | Pohmerer et al. |
| 2008/0319634 A1 | 12/2008 | Odendall |
| 2009/0084089 A1 * | 4/2009 | Arlt et al. .................. 60/295 |
| 2010/0005781 A1 * | 1/2010 | Schweizer ................. 60/276 |
| 2010/0115924 A1 * | 5/2010 | Gabe et al. ................. 60/285 |
| 2011/0047987 A1 * | 3/2011 | Yoda et al. ................. 60/287 |

FOREIGN PATENT DOCUMENTS

| | | | |
|---|---|---|---|
| DE | 10064499 B4 * | 11/2011 | |
| JP | 2002038929 A * | 2/2002 | ............... F01N 3/20 |
| JP | 2007107498 A * | 4/2007 | |
| JP | 2007315235 A * | 12/2007 | |

* cited by examiner

$NO_x$ ADSORBER CATALYST CONDITION EVALUATION APPARATUS AND ASSOCIATED METHODS

FIELD

This disclosure relates to the performance and condition of exhaust aftertreatment devices of an internal combustion engine system, and more particularly to determining and evaluating the performance and degradation of a NOx adsorber catalyst of an exhaust aftertreatment system.

BACKGROUND

Exhaust emissions regulations for internal combustion engines have become more stringent over recent years. For example, the regulated emissions of NOx (also written as $NO_x$) and particulates from diesel-powered internal combustion engines are low enough that, in many cases, the emissions levels cannot be met with improved combustion technologies. Therefore, the use of exhaust aftertreatment systems on engines to reduce harmful exhaust emissions is increasing. Typical exhaust aftertreatment systems include any of various components configured to reduce the level of harmful exhaust emissions present in the exhaust gas. For example, some exhaust aftertreatment systems for diesel-powered internal combustion engines include various components, such as a diesel oxidation catalyst (DOC), a particulate matter filter or diesel particulate filter (DPF), and a NOx adsorber catalyst (NAC) or NOx trap. In some exhaust aftertreatment systems, exhaust gas first passes through the DOC, then passes through the DPF, and subsequently passes through the NAC.

Each of the DOC, DPF, and NAC components is configured to perform a particular exhaust emissions treatment operation on the exhaust gas passing through or over the components. The DOC, DPF, and NAC each includes a catalyst bed or substrate that facilitates the corresponding exhaust emissions treatment operation. Generally, the catalyst bed of the DOC reduces the amount of carbon monoxide and hydrocarbons present in the exhaust gas via oxidation techniques. The substrate of the DPF filters harmful diesel particulate matter and soot present in the exhaust gas. Finally, the catalyst bed of the NAC reduces the amount of NOx present in the exhaust gas.

Generally, the catalyst bed of the NAC is configured to intermittently trap or adsorb NOx and oxygen, and then release or desorb the trapped NOx and oxygen while reducing the released NOx to $N_2$ and other compounds to meet emissions standards. NOx and oxygen is adsorbed on the catalyst bed while the engine runs lean (resulting in excess oxygen in the exhaust gas passing through the NAC). The release and reduction of NOx trapped on the NAC, otherwise called a regeneration of the NAC, occurs while the engine runs rich (resulting in excess hydrocarbons in the exhaust gas passing through the NAC). As the unused hydrocarbons pass over the trapped NOx, the NOx will join with the hydrocarbons to produce less harmful emissions, such as $H_2O$ and $N_2$.

As a NAC ages over time, or when a NAC is defective, the catalytic sites on the catalyst bed for adsorbing NOx and oxygen become deactivated, which results in the NAC being less effective at trapping NOx and oxygen. Further, excess NOx emissions may occur if a NAC is inadvertently missing from the vehicle. Accordingly, current on-board diagnostic regulations require detection and communication to a user of ill-performing, degraded, or missing NAC to limit the emission of excess NOx into the atmosphere.

Conventional systems determine the performance and degradation of a NAC in a variety of ways. According to one system, the performance and degradation of the NAC is determined by attempting to estimate a lean-to-rich exhaust transition area subsequent rich-to-lean exhaust transition area. The estimated transition areas are based on a calculated difference between an NAC upstream air-fuel ratio value and a NAC downstream air-fuel ratio value, as well as an indication whether a regeneration event is occurring. In other systems, only those NAC input and output air-fuel ratio values obtained over a short period of time at the beginning of NAC regeneration events are used to determine the performance and degradation of the NAC.

According to conventional gasoline-powered engines using three-way catalysts (TWC), the performance of the TWC is determined by estimating the oxygen storage capacity of the TWC. More specifically, the performance of the TWC is determined by detecting changes in the oxygen storage capacity as the TWC ages.

SUMMARY

The subject matter of the present application has been developed in response to the present state of the art, and in particular, in response to the problems and needs in the exhaust aftertreatment art that have not yet been fully solved by currently available exhaust aftertreatment systems. Accordingly, the subject matter of the present application has been developed to provide an apparatus, system, and method for evaluating or determining the performance and degradation of a NAC in a diesel-powered engine system that overcomes many of the shortcomings of the prior art.

The subject matter of the present disclosure is based on the recognition that the ability of excess hydrocarbons in the exhaust gas to reduce NOx diminishes as the catalytic sites of the NAC become deactivated. Accordingly, according to some embodiments described herein, the subject matter of the present disclosure uses the hydrocarbon processing capabilities of the NAC as a surrogate for the NOx reduction performance and overall degradation of the NAC. Therefore, instead of basing the performance of the NAC on a calculation of the oxygen storage capacity of the NAC, some embodiments described herein base the determination of the performance of the NAC on the ability of the NAC to reduce or process excess hydrocarbons in the exhaust gas. Additionally, in some embodiments, the subject matter of the present disclosure utilizes NAC outlet air-fuel ratio values over long periods of time during a single or multiple NAC regeneration events instead of during only a short period of time at the beginning of multiple NAC regeneration events. Because of the highly transient nature of modern engine operation, such conventional techniques lead to short evaluations taking place at inopportune moments. Therefore, the apparatus, method, and system of the present disclosure, in some embodiments, utilizes a more robust technique to determine the performance of the NAC than conventional techniques.

For example, according to one embodiment, an apparatus for evaluating the condition of a NAC of an internal combustion engine system includes a rich condition timing module, NAC outlet lambda module, and NAC condition module. The rich condition timing module is configured to accumulate the total time during which exhaust gas exiting the NAC has a lambda value less than 1.0. The NAC outlet lambda module is configured to store NAC outlet lambda values of the exhaust gas while the exhaust gas exiting the NAC has a lambda value less than 1.0. The NAC condition module is configured to evaluate the condition of the NAC based on the total time during which exhaust gas exiting the NAC has a lambda value less than 1.0 and an accumulation of the stored NAC outlet lambda values.

In some implementations of the apparatus, the NAC condition module evaluates the condition of the NAC based on a ratio of the total time during which exhaust gas exiting the NAC has a lambda value less than 1.0 and the accumulation of the stored NAC outlet lambda values. The accumulation of the stored NAC outlet lambda values includes an accumulation of modified NAC outlet lambda values each calculated by multiplying a lambda value acquisition time interval by the difference between one and a respective stored NAC outlet lambda value. The NAC condition module may evaluate the condition of the NAC based on whether the ratio of the total time during which exhaust gas exiting the NAC has a lambda value less than 1.0 and the accumulation of the stored NAC outlet lambda values exceeds a predetermined threshold. The NAC condition module can set the condition of the NAC as unhealthy if the ratio exceeds the threshold and healthy if the ratio does not exceed the threshold. The NAC condition module can also set the condition of the NAC as one of a plurality of conditions based on the difference between the ratio and the threshold. In certain implementations, the NAC condition module sets the condition of the NAC as missing if the ratio exceeds the threshold by a predetermined amount.

According to some implementations, the apparatus further includes an enablement module that is configured to disable and enable the rich condition timing module, the NAC outlet lambda module, and the NAC condition module. The enablement module disables the rich condition timing module, the NAC outlet lambda module, and the NAC condition module when a NAC regeneration event is not occurring and enables the rich condition timing module, the NAC outlet lambda module, and the NAC condition module when a NAC regeneration event is occurring.

In certain implementations of the apparatus, the rich condition module is configured to determine whether the total time during which exhaust gas exiting the NAC has a lambda value less than 1.0 is above a predetermined time threshold. In such implementations, the NAC condition module evaluates the condition of the NAC only if the total time exceeds the predetermined time threshold.

According to another embodiment, a method for evaluating the condition of a NAC of an internal combustion engine system includes determining whether lambda values of exhaust gas exiting the NAC are less than 1.0. The method also includes storing lambda values of exhaust gas exiting the NAC only while the lambda values of exhaust gas exiting the NAC are less than 1.0. Further, the method includes accumulating the total time spent while the lambda values of exhaust gas exiting the NAC were less than 1.0. The method additionally includes setting a condition of the NAC based on the stored lambda values and the accumulated total time.

In certain implementations of the method, the condition of the NAC is set based on a ratio of the stored lambda values and accumulated total time. According to more specific implementations, the method includes calculating a modified lambda value for each of the stored lambda values where each modified lambda value is defined by a lambda sampling rate multiplied by the difference between one and a respective stored lambda value. In the specific implementations, the condition of the NAC is set based on a ratio of a summation of the modified lambda values and the accumulated total time. The condition of the NAC can be set based on whether the ratio of the summation of the modified lambda values and the accumulated total time exceeds a threshold.

According to some implementations, the method further includes determining whether the total time spent while the lambda values of exhaust gas exiting the NAC were less than 1.0 is above a threshold. In such implementations, the condition of the NAC is not set unless the total time exceeds the threshold. The stored lambda values and total time can be reset if the total time is less than the threshold.

In certain implementations, the method includes determining whether a NAC regeneration event is occurring. The actions of the method (including determining whether lambda values of exhaust gas exiting the NAC are less than 1.0, storing lambda values of exhaust gas exiting the NAC only while the lambda values of exhaust gas exiting the NAC are less than 1.0, accumulating the total time spent while the lambda values of exhaust gas exiting the NAC were less than 1.0, and setting a condition of the NAC based on the stored lambda values and the accumulated total time) are not performed unless a NAC regeneration event is occurring. The total time spent while the lambda values of exhaust gas exiting the NAC were less than 1.0 includes time from multiple NAC regeneration events. The time from each of the multiple NAC regeneration events can vary based on the lambda values of exhaust gas exiting the NAC during the NAC regeneration events. Further, in some implementations, determining whether lambda values of exhaust gas exiting the NAC are less than 1.0 includes acquiring the lambda values throughout the entire NAC regeneration event according to a predetermined data acquisition rate.

According to yet another embodiment, an exhaust aftertreatment system communicable in exhaust receiving communication with an internal combustion engine includes a NAC through which an exhaust gas stream is flowable. The system also includes an oxygen sensing device positioned proximate an outlet of the NAC. The oxygen sensing device is capable of detecting an amount of oxygen in the exhaust gas exiting the NAC. The system further includes a controller communicable in electronic communication with the sensing device to receive detected oxygen amounts from the sensing device. The controller is also configured to convert the detected oxygen amounts to lambda values. The controller includes a rich condition timing module configured to accumulate the total time during which exhaust gas exiting the NAC has a lambda value less than 1.0 and a NAC regeneration event is occurring on the NAC. Additionally, the controller includes a NAC outlet lambda module configured to accumulate modified NAC outlet lambda values only when exhaust gas exiting the NAC has lambda values less than 1.0 and a NAC regeneration event is occurring on the NAC. Each modified NAC outlet lambda value is calculated by multiplying a lambda value acquisition time internal by the difference between one and a respective lambda value. Further, the controller includes a NAC condition module configured to set a condition of the NAC by comparing a ratio of the accumulated modified NAC outlet lambda values and the accumulated total time to a predetermined threshold value. The NAC condition module compares the ratio to the predetermined threshold value and sets the condition of the NAC only if the accumulated total time is greater than a threshold time.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
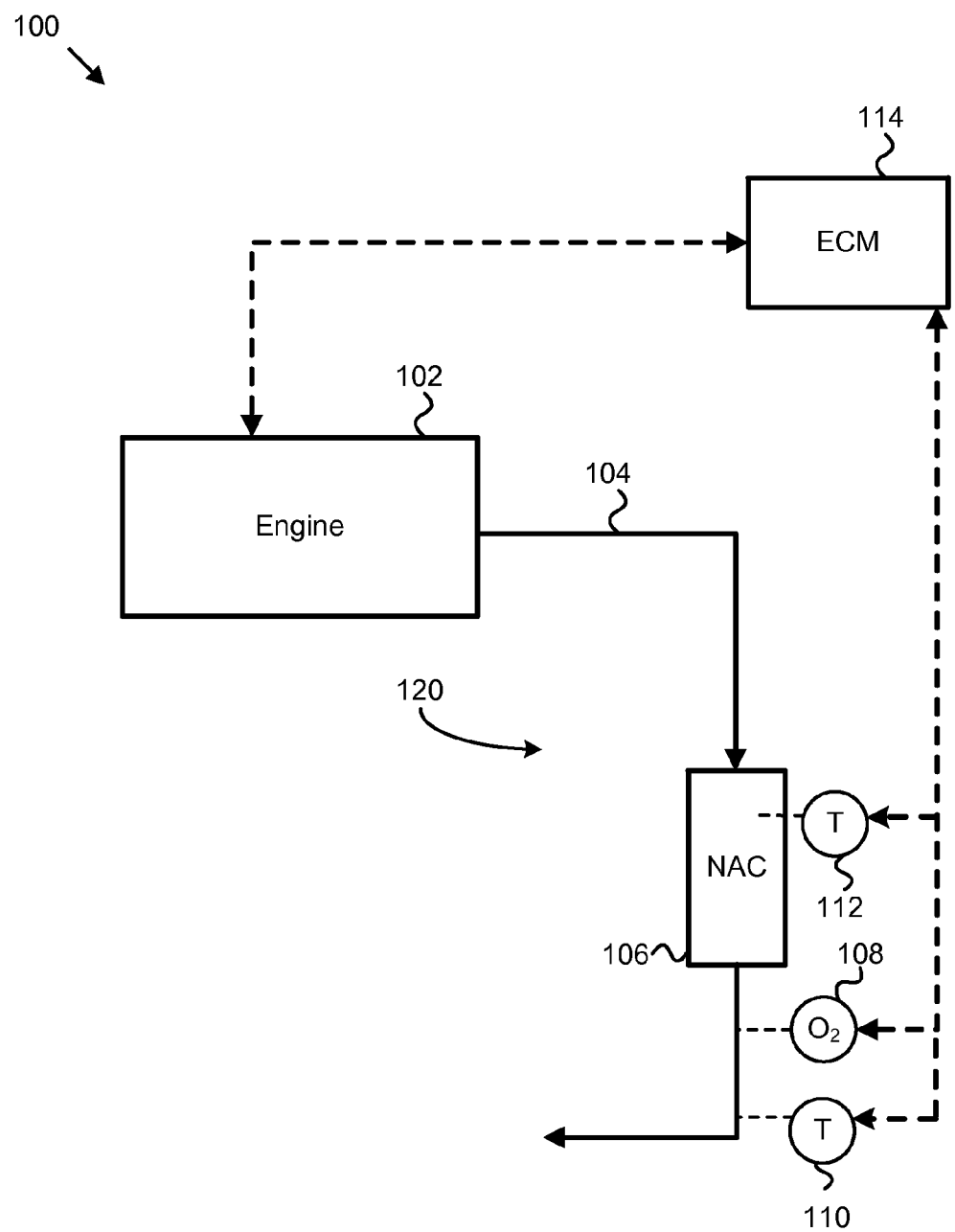
FIG. 1 is a schematic block diagram of an internal combustion engine system having an engine, exhaust gas aftertreatment system, and an engine control module according to one representative embodiment.

According to one embodiment depicted in FIG. 1, an internal combustion engine system 100 includes an internal combustion engine 102 operable to produce an exhaust stream 104. The engine 102 may be a diesel-powered engine, or a gasoline-powered engine operated lean. The system 100 further includes an exhaust gas aftertreatment system 120 in exhaust gas receiving communication with the engine 102. The aftertreatment system 120 includes conduits or piping (not shown) to channel the exhaust stream 104 from the engine 102, through the aftertreatment system 120, and into the atmosphere. Positioned along the conduits, the aftertreatment system 120 includes one or more exhaust gas aftertreatment devices configured to reduce harmful emissions from the exhaust stream 104. In the illustrated embodiment, the aftertreatment system 120 includes a NOx adsorber catalyst (NAC) 106 configured to reduce NOx emissions within the exhaust stream 104. The NAC 106 includes a catalyst made from platina group metals (PGM) that form a plurality of catalytic sites configured to adsorb NOx from the exhaust stream 104. Periodically, the engine 102 is selectively operable to regenerate the NAC 106 by transitioning from lean operation (i.e., excess of oxygen in the exhaust stream 104) to rich operation (i.e., excess of hydrocarbons in the exhaust stream). The excess hydrocarbons cause the adsorbed NOx components to desorb and reduce to less harmful components before being expelled into the atmosphere.

The system 100 further includes an oxygen sensor 108 and a temperature sensor 110 downstream of the NAC 106. Although not shown, the system 100 may also include an oxygen sensor upstream of the NAC 106. In certain implementations, the oxygen and temperature sensors 108, 110 are of the "wide range" type, rather than the "switching" type. The oxygen and temperature sensors 108, 110 may be configured to return a voltage or data parameter indicating the oxygen level in and the temperature of the exhaust stream 104. In one embodiment, the oxygen sensor 108 returns a lambda ($\lambda$) value where the lambda value represents the ratio of oxygen in the exhaust stream 104 to the stoichiometric ratio required to completely combust hydrocarbons injected into the system 100 for combustion. In other words, the lambda value represents the ratio between the actual air-to-fuel ratio and the stoichiometric air-to-fuel ratio in the exhaust stream 104. For example, a lambda value of 1.3 indicates the exhaust stream 104 has an excess of oxygen above the stoichiometric amount of oxygen (e.g., engine running lean), a lambda value of 0.7 indicates the exhaust stream has an excess of hydrocarbons above the stoichiometric amount of hydrocarbons (e.g., engine running rich), and a lambda value of 1.0 indicates a stoichiometric ratio of oxygen to hydrocarbons (e.g., engine running stoichiometrically).

The system 100 may further include a temperature determination module 112 for estimating the temperature of the catalyst bed of the NAC 106. The temperature determination module 112 may include one or more temperature sensors (e.g., a NAC upstream temperature sensor (not shown) and the NAC downstream temperature sensor 110) and/or one or more temperature estimation algorithms based on operating parameters and conditions of the engine 102 and/or other factors know in the art. Generally, the temperature determination module 112 is operable to estimate whether the catalyst bed of the NAC 106 is above a threshold temperature associated with normal operation of the NAC 106. In certain implementations, the temperature determination module 112 does not need to determine the temperature of the NAC 106 with a high degree of accuracy. Accordingly, in these implementations, substitutes or surrogates for a specific temperature determination (e.g., a check that the engine 102 has operated for a specified period of time) may sufficiently act as the temperature determination module 112.

In the illustrated embodiment, the engine system 100 further includes a controller or engine control module (ECM) 114. The controller 114 may communicate with various components of the system 100, including the engine 102, the oxygen sensor 108, the temperature sensor 110, the temperature determination module 112, and/or other sensors and actuators according to the hardware of the specific configuration of the system 100. Generally, the controller 114 controls the operation of the engine system 100 and associated sub-systems, such as the engine 102 and exhaust gas aftertreatment system 120. The controller 114 is depicted in FIG. 1 as a single physical unit, but can include two or more physically separated units or components in some embodiments if desired. In certain embodiments, the controller 114 receives multiple inputs, processes the inputs, and transmits multiple outputs. The multiple inputs may include sensed measurements from the sensors and various user inputs. The inputs are processed by the controller 114 using various algorithms, stored data, and other inputs to update the stored data and/or generate output values. The generated output values and/or commands are transmitted to other components of the controller and/or to one or more elements of the engine system 100 to control the system to achieve desired results, and more specifically, achieve desired exhaust gas emissions.

Figure 2:
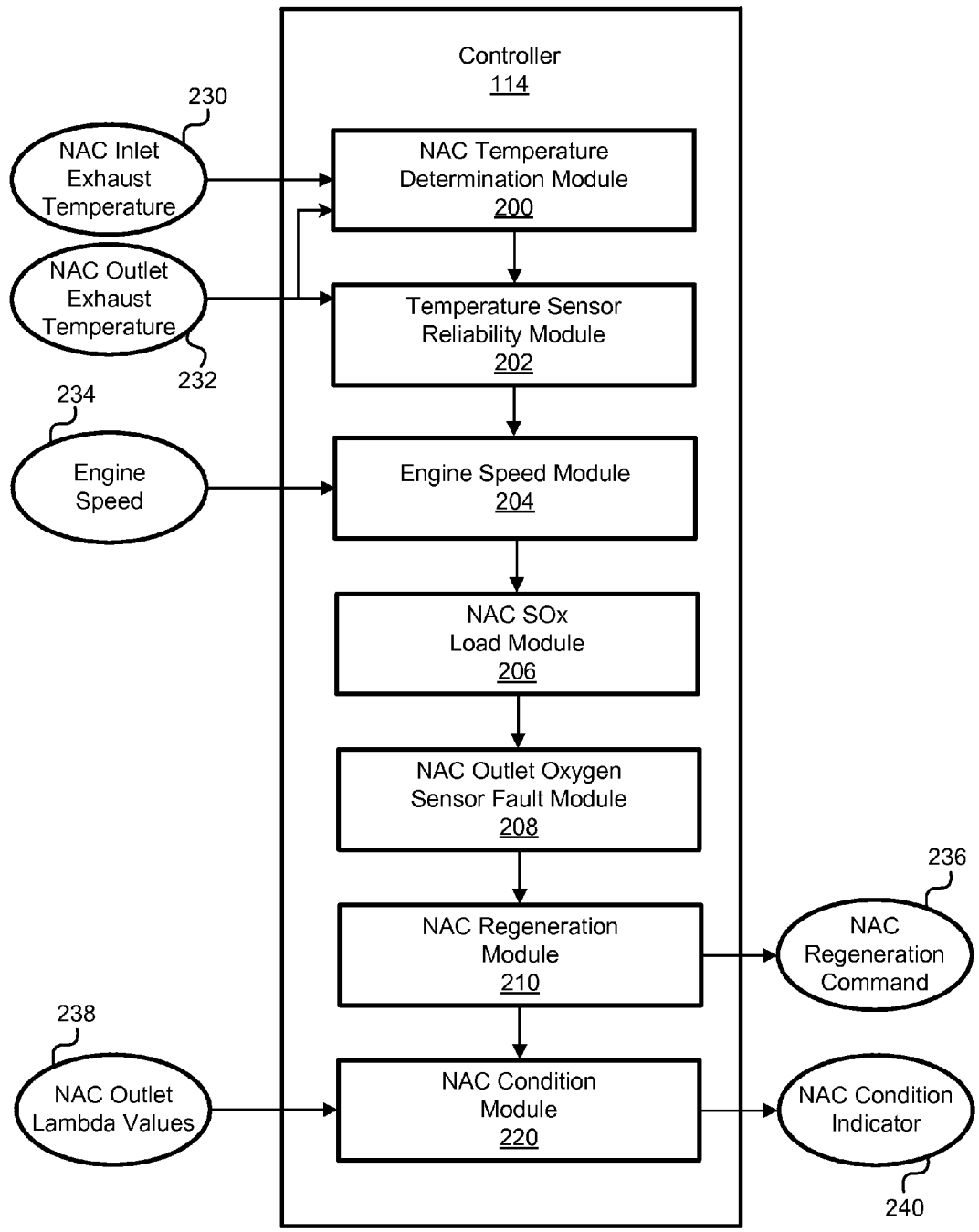
FIG. 2 is a schematic block diagram of the electronic control module or controller of the system of FIG. 1 according to one embodiment.

The controller 114 includes various modules for controlling the operation of the engine system 100. For example, the temperature determination module 112 may be included as part of the controller 114. Additionally, as shown in FIG. 2, the controller 114 includes various modules configured to evaluate the performance, condition, and/or degradation of the NAC 106. In the illustrated embodiment, the controller 114 includes a NAC temperature determination module 200, temperature sensor reliability module 202, engine speed module 204, NAC SOx load module 206, NAC outlet oxygen sensor fault module 208, NAC regeneration module 210, and NAC condition module 220. Generally, the modules 200-210 are configured to determine if conditions are appropriate for the NAC condition module 220 to determine a NAC condition indicator 240 indicating the performance or condition of the NAC.

The NAC temperature determination module 200 may utilize a NAC inlet and outlet exhaust temperature reading 230, 232 from exhaust temperature sensors or virtual sensors to estimate a temperature of the NAC catalyst bed. In certain implementations, for the NAC condition module 220 to be enabled, the estimated temperature of the NAC catalyst bed must be within a predetermined operating range of the NAC. In other words, for a proper assessment of the condition of the NAC, the temperature of the NAC must be high enough to allow for normal operation of the NAC. The NAC temperature determination module 208 can use any of various methods, techniques, and/or algorithms known in the art to estimate the temperature of the NAC 106.

The temperature sensor reliability module 202 is configured to determine if the NAC outlet exhaust temperature 232 is greater than a minimum threshold. In certain implementations, for the NAC condition module 220 to be enabled, the NAC outlet exhaust temperature 232 must be greater than the minimum threshold. Certain negative consequences, such as sensor signal and noise issues, potentially affecting the accuracy of the determination of the NAC condition indicator 240 are more likely present when the NAC outlet exhaust temperature 232 is below the threshold.

The engine speed module 204 is configured to receive an engine speed 234 signal and determine if the speed of the engine 102 is above a predetermined minimum threshold. In certain implementations, for the NAC condition module 220 to be enabled, the engine speed 234 must be above the minimum threshold. For proper assessment of the condition of the NAC 106, the flow rate of the exhaust stream 104, which is directly proportional to the speed of the engine, should be above a certain threshold. The engine speed module 204 can use any of various methods, techniques, and/or algorithms known in the art to determine the speed of the engine 102. Alternatively, the engine speed module 204 may be configured to determine the flow rate of the exhaust stream 104 directly using sensors or other techniques known in the art.

The NAC SOx load module 206 is configured to determine the SOx load on the NAC 106 is less than a maximum threshold. Conventional engine systems employing a NAC typically include a SOx regeneration of the NAC to remove SOx pollutants trapped on the NAC. If too much SOx is trapped on the NAC, the NAC may not be able to adequately perform its NOx-reducing function. Therefore, in certain implementations, for the NAC condition module 220 to be enabled and provide an accurate evaluation of the condition of the NAC 106, the SOx load on the NAC must be less than the maximum threshold. The NAC SOx load module 206 can use any of various methods, techniques, and/or algorithms known in the art to determine the SOx load on the NAC 106.

The NAC outlet oxygen sensor fault module 208 is configured to determine if the NAC outlet oxygen sensor 108 is functioning properly. In certain implementations, the NAC condition module 220 is not enabled unless the NAC outlet oxygen sensor 108 is providing valid measurements of oxygen in the exhaust stream 104. The NAC outlet oxygen sensor fault module 208 can use any of various methods, techniques, and/or algorithms known in the art to determine the status of the oxygen sensor 108.

The NAC regeneration module 210 is configured to control the regeneration of the NAC 106 according to any of various methods, techniques, and/or algorithms known in the art. If regeneration of the NAC 106 is required, or if a predetermined period of time has elapsed since the previous regeneration event, the NAC regeneration module 210 issues a NAC regeneration command 236, which corresponds with a rich exhaust stream or excess of hydrocarbons in the exhaust stream 104 entering the NAC. The increase of hydrocarbons can be added to the exhaust stream by virtue of a pre-combustion and/or post-combustion hydrocarbon injection. In certain implementations, the NAC condition module 220 is not enabled unless the NAC regeneration module 210 has requested a NAC regeneration event and the NAC regeneration event has initiated.

In some embodiments, the above-discussed functionality of the modules 200-210 is not enabled unless the engine 102 is in proper running condition and/or there are no external errors that may affect proper operation of the engine 102 and exhaust aftertreatment system 120. External errors that may affect operation of the engine system 100 include, but are not limited to, diesel particulate filter pressure differential sensor errors, turbocharger errors, NAC closed-loop control errors, and any errors preventing a proper regeneration of the NAC.

After initializing a NAC regeneration event, the NAC outlet lambda remains at or near 1.0 as all of the excess hydrocarbons entering the NAC are reduced in the NOx desorption and reduction process. After stored oxygen on the NAC is used up in the NOx reduction process, there is a shortage of oxygen for hydrocarbon conversion, which leads to the emission of excess hydrocarbons from the NAC and causes the NAC outlet lambda values to drop below 1.0. The poorer the health of the NAC, the fewer catalytic sites available for oxygen storage and NOx trapping, which results in lambda values dropping below 1.0 faster after the start of the NAC regeneration event and lambda values remaining below 1.0 longer during the NAC regeneration event. Accordingly, monitoring and utilizing the time during NAC regeneration events that the lambda values remain below 1.0 contribute to an effective and robust approach to determining the condition of the NAC.

Figure 3:
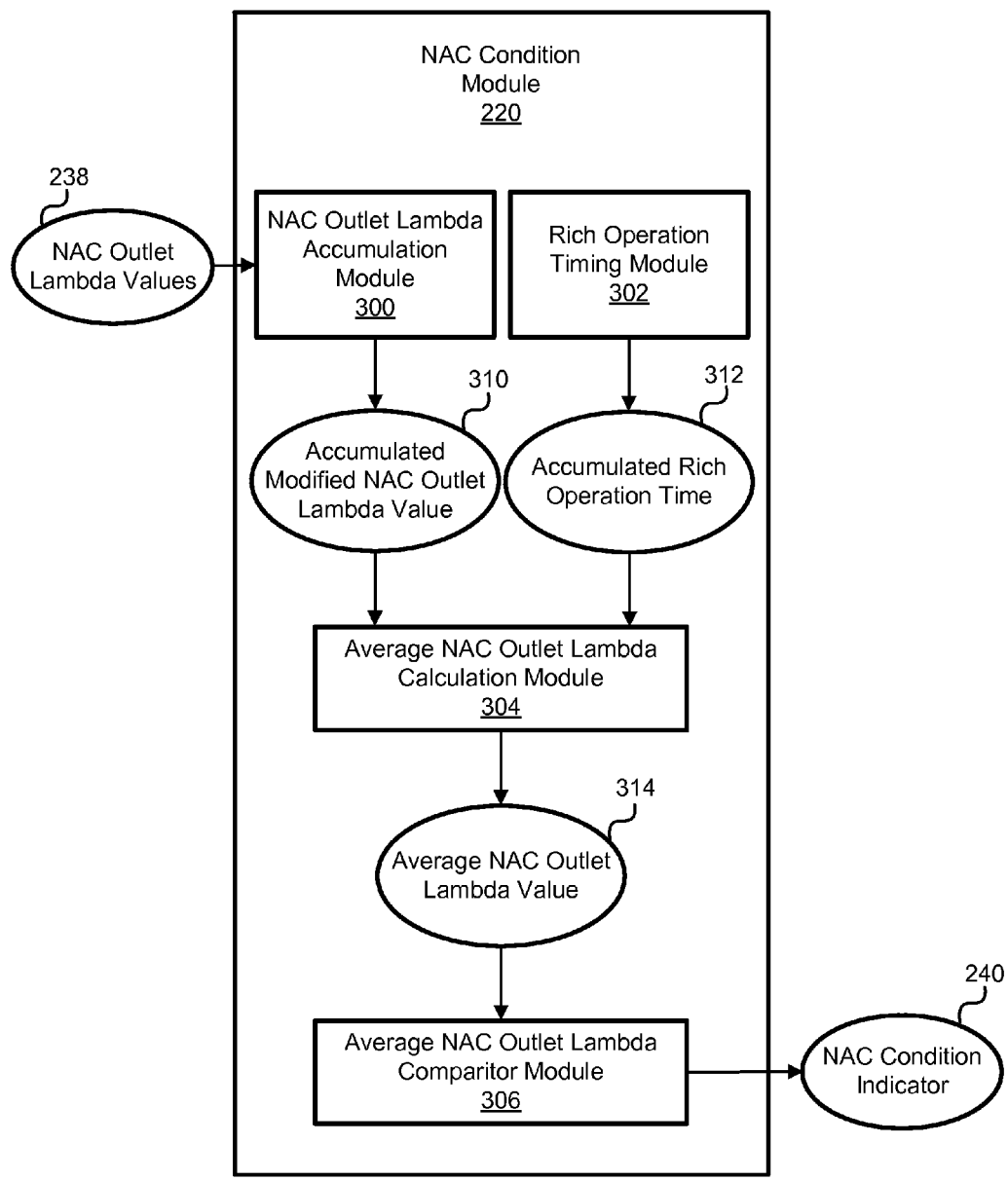
FIG. 3 is a schematic block diagram of a NAC condition module of the controller of FIG. 1 according to one embodiment.

Referring to FIG. 3, the NAC condition module 220 is configured to determine the NAC condition indicator 240 based at least partially on NAC outlet lambda values 238 received directly or indirectly from the oxygen sensor 108. The NAC condition module 220 includes a NAC outlet lambda accumulation module 300 and a rich operation timing module 302. The NAC outlet lambda accumulation module is configured to determine an accumulated modified or integrated NAC outlet lambda value 310 (hereinafter "accumulated lambda") according to the following equation:

$$\text{Accumulated Lambda} = \sum_{i=1}^{n} [(1 - \lambda) * t]_i \quad (1)$$

where $\lambda$ is the NAC outlet lambda value, t is a predetermined data acquisition rate or sampling interval associated with the acquisition of the NAC outlet lambda values, and n is the number of NAC outlet lambda values acquired while the NAC outlet lambda values remained less than 1.0. The rich operation timing module 302 is configured to determine an accumulated rich operation time 312, which represents the total accumulated time during which the acquired NAC outlet lambda values were less than 1.0 (hereinafter "accumulated time"). In one implementation, the accumulated rich operation time 312 is determined by multiplying the predetermined data acquisition rate t by the number n of Equation 1. Alternatively, the rich operation timing module 302 may include a timer that increments when the NAC outlet lambda values are less than 1.0 and does not increment when the NAC outlet lambda values are equal to or more than 1.0.

The NAC condition module 220 also includes an average NAC outlet lambda calculation module 304 that is configured to determine an average NAC outlet lambda value 314 based on a ratio of the accumulated lambda and the accumulated time as follows:

$$AverageNACOutletLambda = \frac{AccumulatedLambda}{AccumulatedTime} \quad (2)$$

An average NAC outlet lambda comparator module 306 of the NAC condition module 220 is configured to compare the average NAC outlet lambda value with a predetermined threshold. The average NAC outlet lambda comparator module 306 issues a NAC condition indicator 240 indicating the condition or performance of the NAC 106 based on the comparison between the average NAC outlet lambda value 314 and the predetermined threshold. In one embodiment, the comparator module 306 issues a 'PASS' NAC condition indicator 240 if the average NAC outlet lambda value 314 is less than the predetermined threshold. Similarly, in the same embodiment, the comparator module 306 issues a 'FAIL' NAC condition indicator 240 if the average NAC outlet lambda value 314 is greater than the predetermined threshold. In certain embodiments, a 'FAIL' NAC condition indicator 240 is communicated to an on-board diagnostic (OBD) controller that alerts a user (e.g., driver of a vehicle in which the engine system 100 is housed) of the unhealthy condition or absence of the NAC 106.

In alternative embodiments, the comparator module 306 can be configured to issue any of a plurality of NAC condition indicators 240 (e.g., high health, medium-high health, medium health, medium-low health, low health, and fail) based on the relative proximity of the average NAC outlet lambda value 314 to the predetermined threshold. For example, the comparator module 306 may issue a high health indicator 240 if the average NAC outlet lambda value 314 is well below the predetermined threshold and a low health indicator 240 if the average NAC outlet lambda value is just less than the predetermined threshold. In certain embodiments, the condition indicator 240 is communicated to an OBD controller that alerts a user of the condition of the NAC 106 associated with the indicator.

Generally, the predetermined threshold for the average NAC outlet lambda value 314 corresponds with the maximum average NAC outlet lambda value for a healthy or properly-functioning NAC 106. The predetermined threshold can be based on any of various factors, including, but not limited to, the duty cycle of the engine system 100, the size of the NAC 106, user preferences, driving patterns (e.g., on-highway or urban driving), and empirical data. In one embodiment, the predetermined threshold value is determined and set during a calibration stage of the development of a family of engines with common duty cycles. In other embodiments, the predetermined threshold value is calculated dynamically based on changing physical and operating conditions of the engine system 100 and/or the changing conditions of the surrounding environment.

Figure 4:
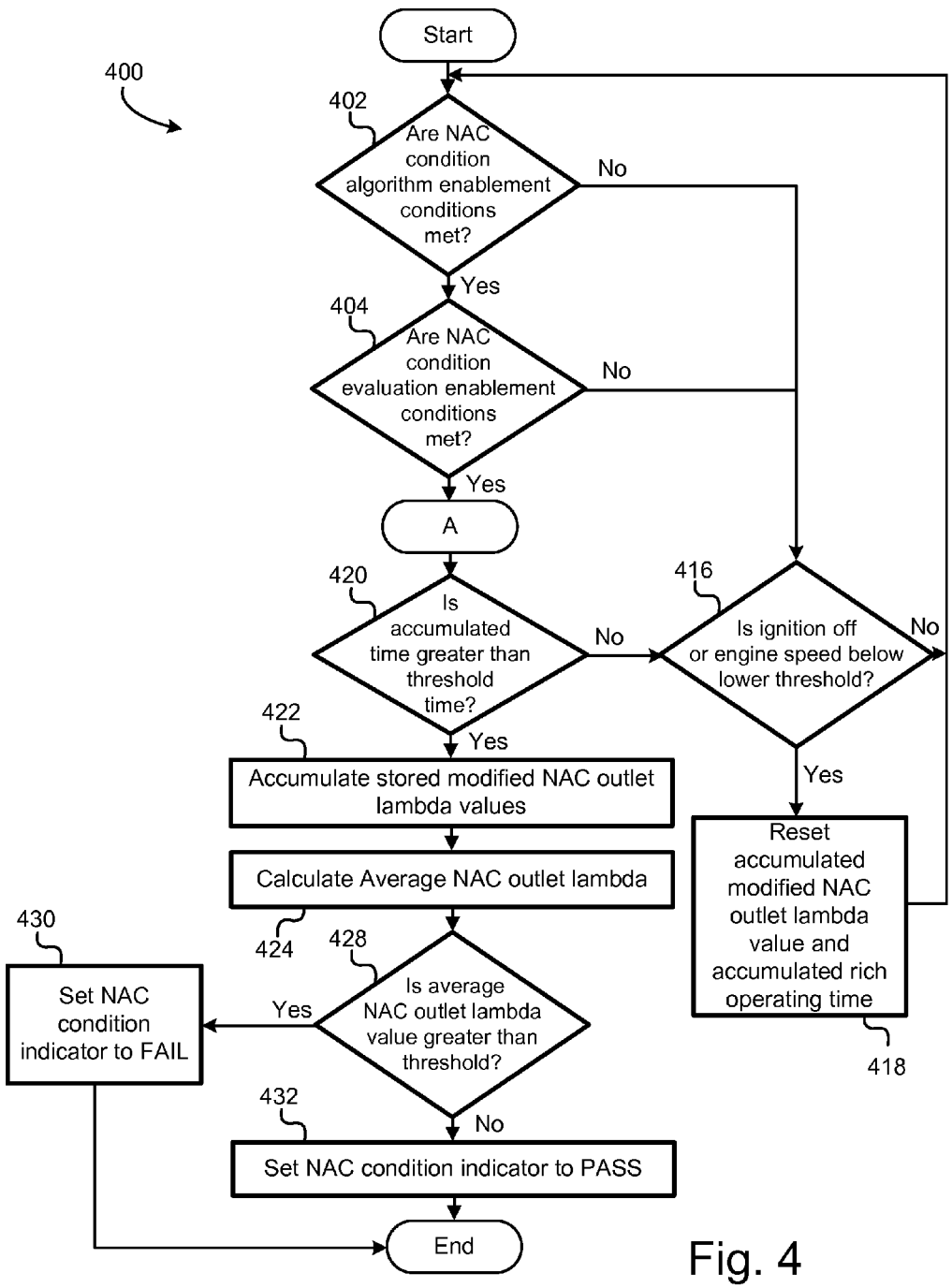
FIG. 4 is a schematic flow chart diagram depicting a method for evaluating the condition of a NAC according to one embodiment.

Referring to FIG. 4, and according to one embodiment, a method 400 for evaluating the condition of a NAC, such as NAC 106, includes determining at 402 whether enablement conditions for executing a NAC condition algorithm are met. In certain implementations, the algorithm enablement conditions associated with the action 402 of the method 400 include at least one of an engine in proper running condition and no external errors being present. As discussed above, external errors may include, but are not limited to, diesel particulate filter pressure differential sensor errors, turbocharger errors, NAC closed-loop control errors, and any errors preventing a proper regeneration of the NAC. If the algorithm enablement conditions are met as determined at 402, then the method 400 proceeds to determine at 404 whether enablement conditions for executing a NAC condition evaluation are met. In certain implementations, the evaluation enablement conditions associated with the action 404 include at least one of a NAC temperature within a predetermined operating range, a NAC outlet exhaust temperature above a minimum threshold, a speed of the engine above a predetermined minimum speed, a SOx load on the NAC below a maximum threshold, a properly functioning NAC outlet oxygen sensor, and an occurring or initiated NAC regeneration event. If the evaluation enablement conditions are met as determined at 404, then the method 400 proceeds to sub-method A.

However, if either of the NAC algorithm or evaluation enablement conditions are not met, then the method 400 proceeds to determine at 416 whether the engine or ignition key is off, or if the engine speed is below a lower speed threshold. Should it be determined that the engine or ignition key is off, then any stored modified outlet lambda values (and, in certain implementations, any stored sensed or acquired outlet lambda values) are reset or deleted at 418, and the method 400 returns to action 402. For example, in certain implementations, when the engine key is off, the accumulated lambda value is reset to zero. If the engine or ignition key is determined to be on at 416, then the method 400 effectively skips the resetting action at 418 and returns to action 402.

Figure 5:
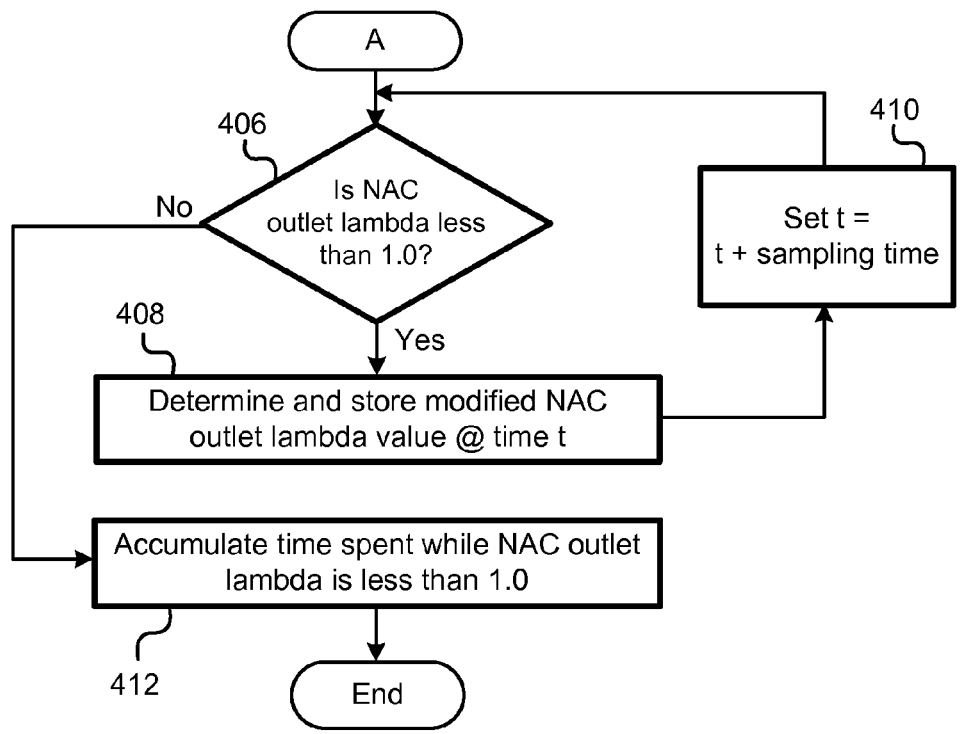
FIG. 5 is a schematic flow chart diagram depicting a sub-method of the method of FIG. 4 according to one embodiment.

Referring to FIG. 5, sub-method A includes at 406 determining whether the NAC outlet lambda is less than 1.0. If action 406 is answered affirmatively (i.e., the NAC outlet lambda is less than 1.0), then sub-method A proceeds at 408 to determine and store a modified NAC outlet lambda value at time t. Following action 408, the sub-method A resets time t to be equal to the current time t plus a sampling time at 410. As discussed above, the sampling time is equal to the predetermined amount of time between data acquisitions, which corresponds direction with the preset data acquisition rate. After resetting the time t, the sub-method A returns to action 406 and determines again whether the NAC outlet lambda is less than 1.0 and if so, stores another modified NAC outlet lambda value, but at the new reset time t, instead of the old time t. The sub-method A continues to determine and store at 408 separate modified NAC outlet lambda values at respective times set at 410 until the NAC outlet lambda rises above 1.0. If the NAC outlet lambda is not less than 1.0 as determined at 406, then the sub-method A accumulates at 412 the total amount of time that the NAC outlet lambda was less than 1.0. Following action 412, sub-method A ends, and the method 400 proceeds to determine at 420 (FIG. 4) whether the accumulated time spent while the NAC outlet lambda was less than 1.0 is greater than a threshold value. If the accumulated time is less than the threshold value, then the method 400 effectively delays the completion of or restarts the NAC condition evaluation process by executing the determination at 416.

However, if the accumulation time is more than the threshold value as determined at 420, then the method 400 accumulates at 422 the stored modified NAC outlet lambda values determined during the execution of the loop of sub-method A. The method 400 then calculates at 424 an average NAC outlet lambda value by dividing the accumulated stored modified NAC outlet lambda value determined at 422 by the accumulated time spent while the NAC outlet lambda was less than 1.0 determined at 414 according to Equation 2 above. The calculated average NAC outlet lambda value is compared to a threshold at 428. If the calculated average NAC outlet lambda value is greater than the threshold, then the method 400 sets a NAC condition indicator to 'FAIL' at 430. However, if the calculated average NAC outlet lambda value is less than the threshold, then the method 400 sets the NAC condition indicator to 'PASS' at 432. Although not shown, in certain implementations, the NAC condition indicator is communicated to an OBD controller and/or an on-board display.

In some implementations, the accumulated time threshold is predetermined based on a perceived minimum amount of time necessary to obtain enough modified NAC outlet lambda values for a sufficiently accurate evaluation of the condition of the NAC. For example, the threshold can be determined using empirical data from a "good" NAC and a "bad" NAC. The time may accumulate over multiple NAC regeneration events. In other words, the accumulated time does not start at the beginning of a NAC regeneration event and reset at the end of the event. Additionally, the accumulated time is not a preset amount of time or specific time period during one or more NAC regeneration event. Instead, the accumulated time during NAC regeneration events can be variable from one regeneration event to another depending on whether the NAC outlet lambda values are below 1.0 and the length of each NAC regeneration event.

FIGS. 4 and 5 are a schematic flow chart diagrams illustrating one embodiment of a method 400 for evaluating the condition of a NAC. The method 400 substantially includes the steps to carry out the functions presented above with respect to the operation of the described engine system 100 and associated modules. Furthermore, although some of the operations of the method 400 can be being performed by a particular module of the engine system 100, other embodiments may incorporate other modules in addition to or in place of the modules of the system.

Figure 6A:
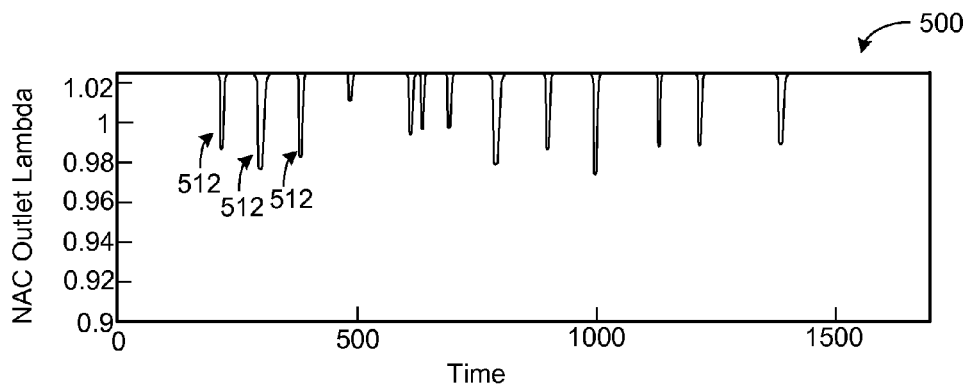
FIGS. 6A-6C are graphs representing NAC outlet lambda values, accumulated NAC outlet lambda values, and average NAC outlet lambda values, respectively, over time for a system with a healthy NAC.
Figure 6B:
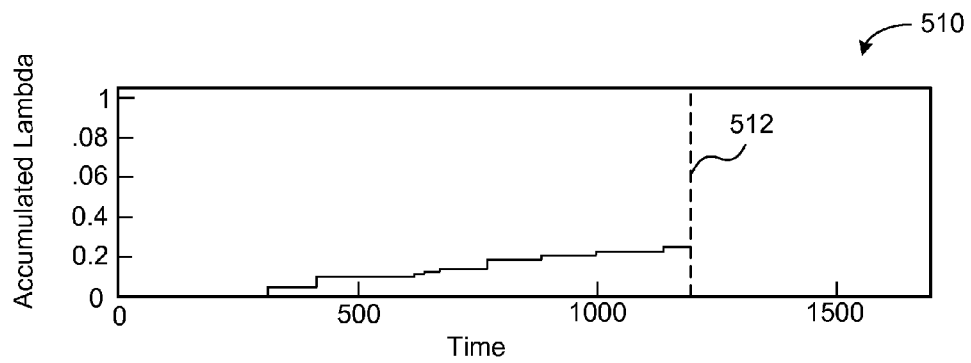
Figure 6C:
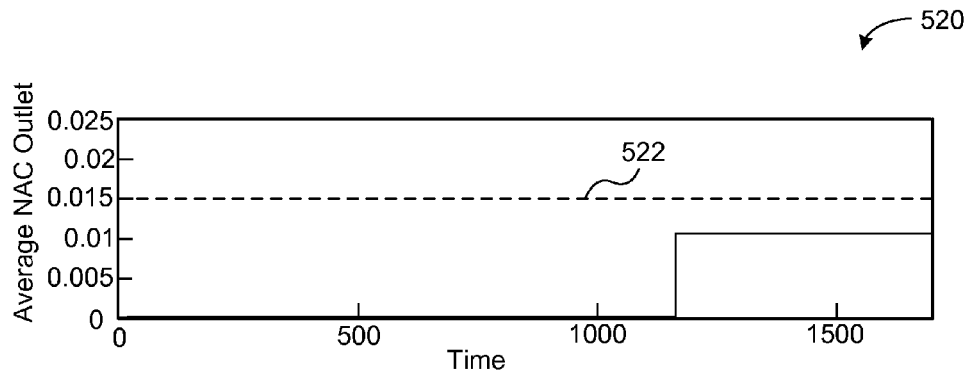
Figure 7A:
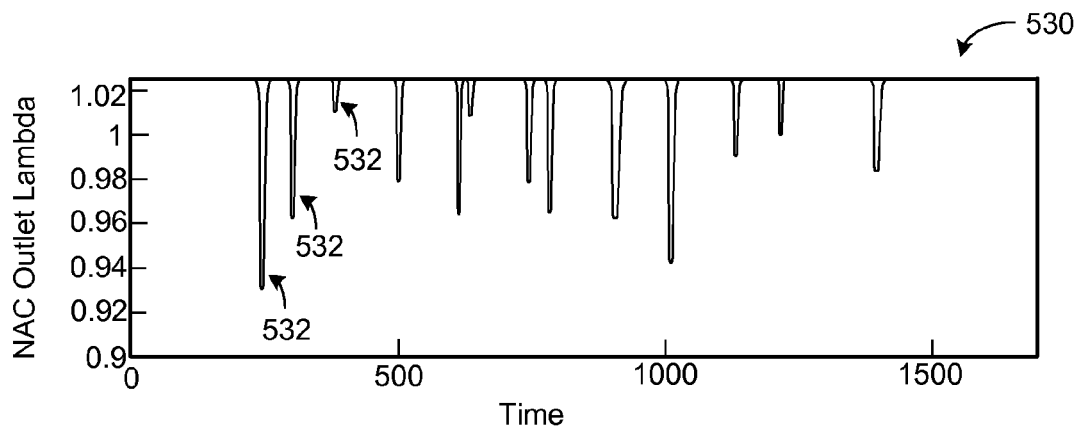
FIGS. 7A-7C are graphs representing NAC outlet lambda values, accumulated NAC outlet lambda values, and average NAC outlet lambda values, respectively, over time for a system with an unhealthy NAC.
Figure 7B:
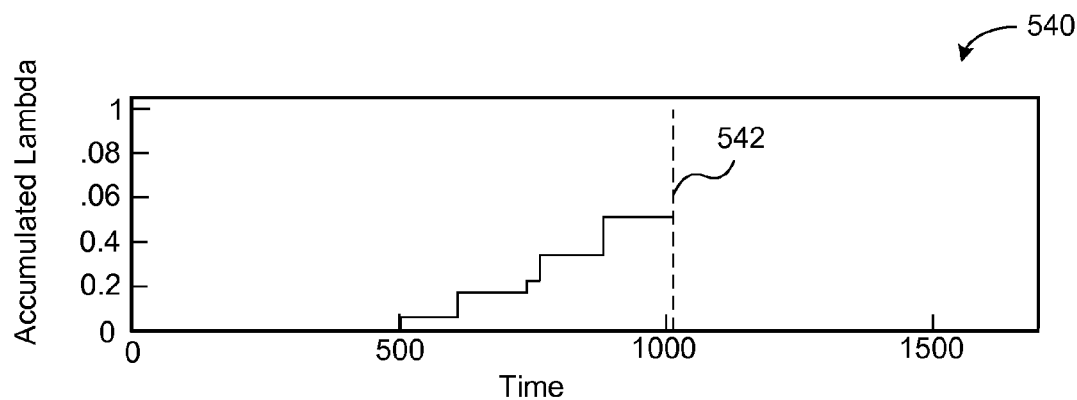
Figure 7C:
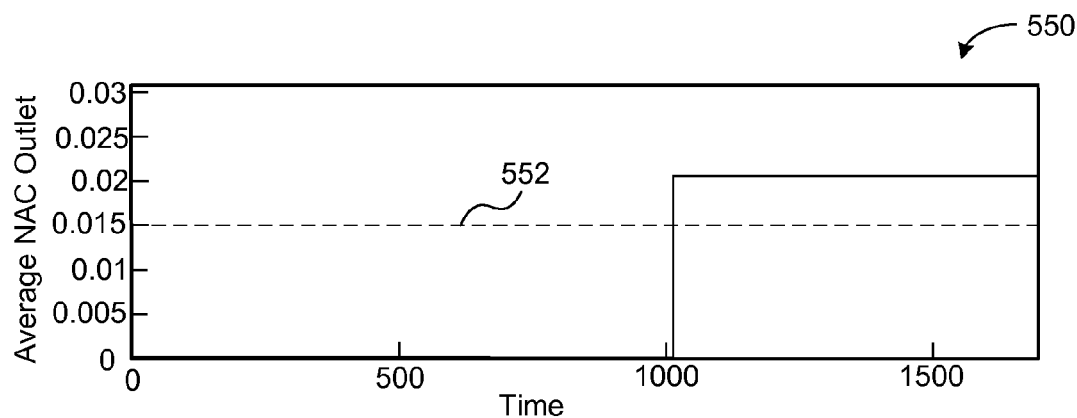
Figure 8A:
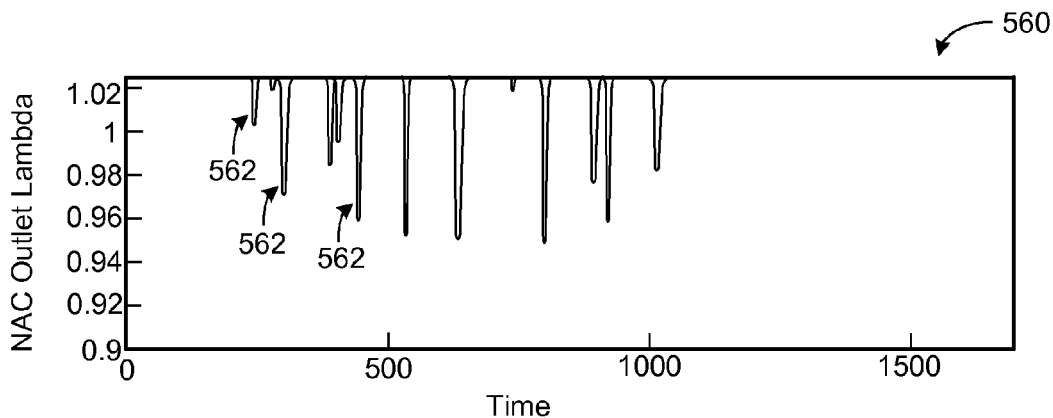
FIGS. 8A-8C are graphs representing NAC outlet lambda values, accumulated NAC outlet lambda values, and average NAC outlet lambda values, respectively, over time for a system with a missing NAC.
Figure 8B:
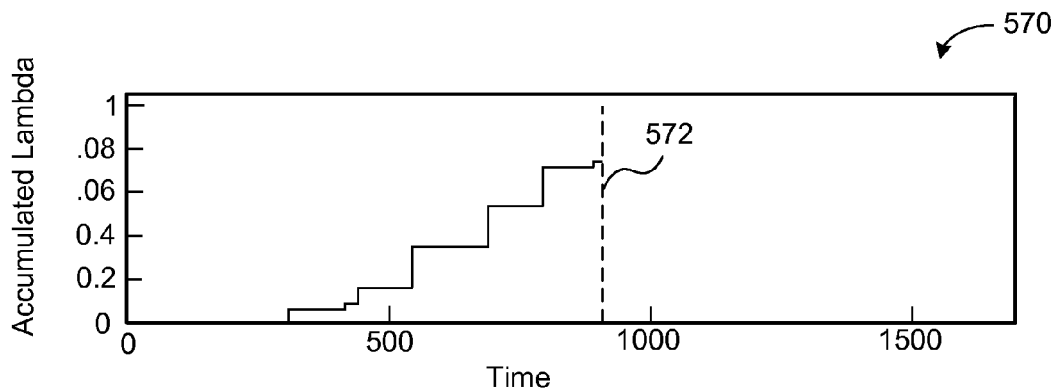
Figure 8C:
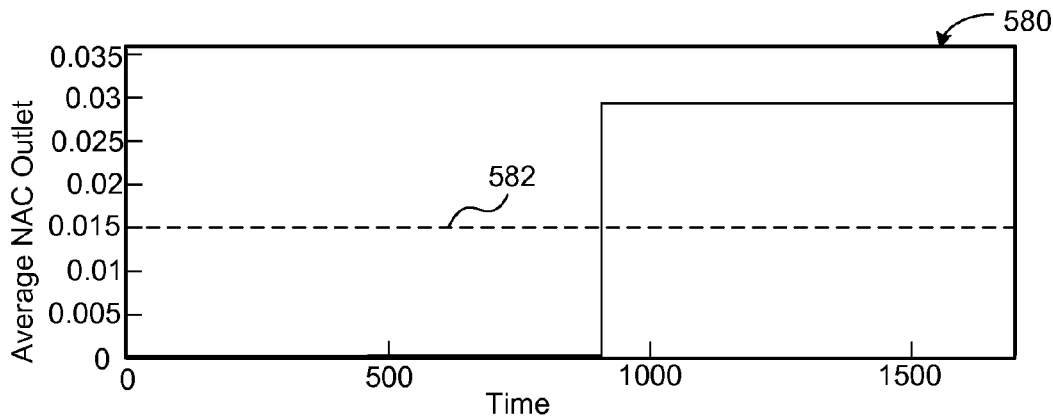

FIGS. 6-8 show probable results from the execution of the method 400 on a system with a healthy NAC (i.e., FIGS. 6A-6C), an unhealthy NAC (i.e., FIGS. 7A-7C), and a missing NAC (i.e., FIGS. 8A-8C) according to at least some embodiments. Referring first to a system with a healthy NAC, FIG. 6A shows NAC outlet lambda values over time for multiple NAC regeneration events 512 (shown as NAC outlet lambda spikes). For most regeneration events 512, the NAC outlet lambda values decrease from a value greater than 1.0 to a value less than 1.0, and then increases back to a value greater than 1.0. The time periods during each regeneration event 512 for which the NAC outlet lambda value is less than 1.0 are kept track of and stored. The stored time periods are sequentially added together via multiple and successive executions of the sub-method A. Unlike some conventional systems, for each NAC regeneration event where enablement conditions are met, lambda values are detected and acquired throughout the entire NAC regeneration event according to a predetermined data acquisition rate, instead of only during a short period at the beginning of the regeneration event as with conventional systems.

Generally, each regeneration event 512 represents a separate execution of the sub-method A. In some implementations, following each execution of the sub-method A, each stored modified NAC outlet lambda value is added together to determine the accumulated lambda value, which is shown relative to time in FIG. 6B. Accordingly, in some implementations, sub-method A and action 422 is continuously executed until the cumulative time periods reach the time threshold 512 shown in FIG. 6B. As shown in FIG. 6B, at the conclusion of each regeneration event 512 where all enablement conditions are satisfied, the accumulated lambda values increase by an amount equal to the summation of the modified NAC outlet lambda values stored during execution of sub-method A or during the regeneration event. Over time, the accumulated modified NAC outlet lambda values steadily increase until the time threshold 512 is met, at which time the average NAC outlet lambda value is calculated according to Equation 2. The calculated average NAC outlet lambda value is shown as a step increment of the average NAC outlet value in FIG. 6C, which also shows a predetermined average NAC outlet lambda threshold value 522. Because the calculated NAC outlet lambda value of FIG. 6C is less than the threshold value 522, the NAC is considered to be present and healthy, and receives a PASS indicator. If the indicator is then set to PASS, then the average NAC outlet value is reset before the algorithm is run again (e.g., to effectively reset the average NAC outlet value and accumulated NAC outlet values to zero before the next determination of the condition of the NAC is initiated).

Results following the same format as those of FIGS. 6A-6C are shown in FIGS. 7A-7B for an unhealthy NAC. FIG. 7A shows NAC outlet lambda spikes associated with individual NAC regeneration events 532. In the illustrated implementations, the magnitude of the NAC outlet lambda spikes of FIG. 7A is generally higher than the spikes associated with a healthy NAC. Accordingly, in some implementations, the total time spent with the NAC outlet lambda values below 1.0 and the accumulated stored modified NAC outlet lambda values (see, e.g., FIG. 7B) may accumulate faster. Because the accumulated time accumulates faster, the time threshold 542 shown in FIG. 7B is reached sooner. Further, because the calculated NAC outlet lambda value of FIG. 7C is more than the threshold value 552, the NAC is considered to be present, but unhealthy, thus requiring replacement.

Results similar to those of FIGS. 7A-7C are shown in FIGS. 8A-8B for a missing NAC. FIG. 8A shows NAC outlet lambda spikes associated with individual NAC regeneration events 562. In the illustrated implementations, the magnitude of the NAC outlet lambda spikes of FIG. 8A is generally consistently higher than the spikes associated with an unhealthy NAC. Accordingly, in some implementations, the total time spent with the NAC outlet lambda values below 1.0 and the accumulated stored modified NAC outlet lambda values (see, e.g., FIG. 8B) may accumulate faster. Because the accumulated time accumulates faster, the time threshold 572 shown in FIG. 8B is reached sooner. Further, because the calculated NAC outlet lambda value of FIG. 8C is significantly more than the threshold value 582, the NAC is considered to be missing, thus requiring NAC to be installed. In certain implementations, when the average NAC outlet lambda value is greater than the threshold value 582 by a predetermined amount, the NAC is considered missing, and when the average NAC outlet lambda value is greater than the threshold value 582 by less than the predetermined amount, the NAC is considered installed, but unhealthy.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for evaluating the condition of a NOx adsorber catalyst (NAC) of an internal combustion engine system, comprising:
a NOx adsorber catalyst (NAC) through which an exhaust gas stream is flowable;
an oxygen sensor positioned proximate an outlet of the NAC, the oxygen sensor device being capable of detecting an amount of oxygen in the exhaust gas exiting the NAC;
a controller in electronic communication with the oxygen sensor to receive detected oxygen amounts from the oxygen sensor, the controller configured to convert the detected oxygen amounts to lambda values, and wherein the controller comprises:
a rich condition timing module configured to accumulate the total time during which exhaust gas exiting the NAC has a lambda value less than 1.0;
a NAC outlet lambda module configured to store NAC outlet lambda values of the exhaust gas while the exhaust gas exiting the NAC has a lambda value less than 1.0; and
a NAC condition module configured to evaluate the condition of the NAC based on the total time during which exhaust gas exiting the NAC has a lambda value less than 1.0 and an accumulation of the stored NAC outlet lambda values;
wherein the NAC condition module evaluates the condition of the NAC based on a ratio of the total time during which exhaust gas exiting the NAC has a lambda value less than 1.0 and the accumulation of the stored NAC outlet lambda values; and
wherein the accumulation of the stored NAC outlet lambda values comprises an accumulation of modified NAC outlet lambda values each comprising a lambda value acquisition time interval multiplied by the difference between one and a respective stored NAC outlet lambda value.

2. The apparatus of claim 1, wherein the NAC condition module evaluates the condition of the NAC based on whether the ratio of the total time during which exhaust gas exiting the NAC has a lambda value less than 1.0 and the accumulation of the stored NAC outlet lambda values exceeds a predetermined threshold.

3. The apparatus of claim 2, wherein the NAC condition module sets the condition of the NAC as unhealthy if the ratio exceeds the threshold and healthy if the ratio does not exceed the threshold.

4. The apparatus of claim 2, wherein the NAC condition module sets the condition of the NAC as one of a plurality of conditions based on the difference between the ratio and the threshold.

5. The apparatus of claim 4, wherein the NAC condition module sets the condition of the NAC as missing if the ratio exceeds the threshold by a predetermined amount.

6. The apparatus of claim 1, further comprising an enablement module configured to disable and enable the rich condition timing module, the NAC outlet lambda module, and the NAC condition module, wherein the enablement module disables the rich condition timing module, the NAC outlet lambda module, and the NAC condition module when a NAC regeneration event is not occurring and enables the rich condition timing module, the NAC outlet lambda module, and the NAC condition module when a NAC regeneration event is occurring.

7. The apparatus of claim 1, wherein the rich condition module is configured to determine whether the total time during which exhaust gas exiting the NAC has a lambda value less than 1.0 is above a predetermined time threshold, and wherein the NAC condition module evaluates the condition of the NAC only if the total time exceeds the predetermined time threshold.

8. A method for evaluating the condition of a NOx adsorber catalyst (NAC) of an internal combustion engine system, comprising:
regenerating the NOx adsorber catalyst (NAC);
determining whether lambda values of exhaust gas exiting the NAC are less than 1.0;
storing lambda values of exhaust gas exiting the NAC only while the lambda values of exhaust gas exiting the NAC are less than 1.0;
accumulating the total time spent while the lambda values of exhaust gas exiting the NAC were less than 1.0;
setting a condition of the NAC based on the stored lambda values and the accumulated total timer; and
calculating a modified lambda value for each of the stored lambda values, each modified lambda value comprising a lambda sampling rate multiplied by the difference between one and a respective stored lambda value, wherein the condition of the NAC is set based on a ratio of a summation of the modified lambda values and the accumulated total time.

9. The method of claim 8, wherein the condition of the NAC is set based on a ratio of the stored lambda values and accumulated total time.

10. The method of claim 8, wherein the condition of the NAC is set based on whether the ratio of the summation of the modified lambda values and the accumulated total time exceeds a threshold.

11. The method of claim 8, further comprising determining whether the total time spent while the lambda values of exhaust gas exiting the NAC were less than 1.0 is above a threshold, and wherein the condition of the NAC is not set unless the total time exceeds the threshold.

12. The method of claim 11, wherein the stored lambda values and total time are reset if the total time is less than the threshold.

13. The method of claim 8, further comprising determining whether a NAC regeneration event is occurring, wherein determining whether lambda values of exhaust gas exiting the NAC are less than 1.0, storing lambda values of exhaust gas exiting the NAC only while the lambda values of exhaust gas exiting the NAC are less than 1.0, accumulating the total time spent while the lambda values of exhaust gas exiting the NAC were less than 1.0, and setting a condition of the NAC based on the stored lambda values and the accumulated total time are not performed unless a NAC regeneration event is occurring.

14. The method of claim 13, wherein the total time spent comprises time from multiple NAC regeneration events.

15. The method of claim 14, wherein the time from each of the multiple NAC regeneration events varies based on the lambda values of exhaust gas exiting the NAC during the NAC regeneration events.

16. The method of claim 13, wherein determining whether lambda values of exhaust gas exiting the NAC are less than 1.0 comprises acquiring the lambda values throughout the entire NAC regeneration event according to a predetermined data acquisition rate.

17. An exhaust aftertreatment system communicable in exhaust receiving communication with an internal combustion engine, comprising a NOx adsorber catalyst (NAC) through which an exhaust gas stream is flowable;

an oxygen sensor positioned proximate an outlet of the NAC, the oxygen sensor being capable of detecting an amount of oxygen in the exhaust gas exiting the NAC;

a controller in electronic communication with the oxygen sensor to receive detected oxygen amounts from the oxygen sensor, the controller configured to convert the detected oxygen amounts to lambda values, and wherein the controller comprises:

a rich condition timing module configured to accumulate the total time during which exhaust gas exiting the NAC has a lambda value less than 1.0 and a NAC regeneration event is occurring on the NAC;

a NAC outlet lambda module configured to accumulate modified NAC outlet lambda values only when exhaust gas exiting the NAC has lambda values less than 1.0 and a NAC regeneration event is occurring on the NAC, each modified NAC outlet lambda value comprising a lambda value acquisition time internal multiplied by the difference between one and a respective lambda value;

a NAC condition module configured to set a condition of the NAC by comparing a ratio of the accumulated modified NAC outlet lambda values and the accumulated total time to a predetermined threshold value, wherein the NAC condition module compares the ratio to the predetermined threshold value and sets the condition of the NAC only if the accumulated total time is greater than a threshold time.

* * * * *

UNITED STATES PATENT AND TRADEMARK OFFICE
CERTIFICATE OF CORRECTION

PATENT NO. : 8,756,922 B2  
APPLICATION NO. : 13/158240  
DATED : June 24, 2014  
INVENTOR(S) : Waratt Rattasiri, Neal W. Currier and Mathew L. Allen Page 1 of 1

It is certified that error appears in the above-identified patent and that said Letters Patent is hereby corrected as shown below:

In the Claims

Claim 8:

Column 16, line 50, replace --timer-- with "time"

Signed and Sealed this
Twenty-first Day of July, 2015

Michelle K. Lee
*Director of the United States Patent and Trademark Office*